United States Patent [19]
Adams et al.

[11] Patent Number: 5,837,806
[45] Date of Patent: Nov. 17, 1998

[54] POLYANILINES AND THEIR MANUFACTURE

[75] Inventors: Phillip Norman Adams, Durham; Andrew Paul Monkman, Stanhope, both of United Kingdom

[73] Assignee: BICC Public Limited Company, London, England

[21] Appl. No.: 605,793

[22] Filed: Feb. 22, 1996

Related U.S. Application Data

[63] Continuation-in-part of PCT/GB95/00358, Feb. 24, 1995.

[30] Foreign Application Priority Data

| Mar. 4, 1994 | [GB] | United Kingdom | 9404182 |
| Nov. 17, 1994 | [GB] | United Kingdom | 9423173 |

[51] Int. Cl.$^6$ ............................................ C08G 73/02
[52] U.S. Cl. .............. 528/422; 528/502 B; 252/500
[58] Field of Search ............................ 528/422, 502 B; 252/500

[56] References Cited

U.S. PATENT DOCUMENTS

| 5,205,965 | 4/1993 | Uetani et al. | 252/500 |
| 5,324,815 | 6/1994 | Ohtani et al. | 528/422 |

FOREIGN PATENT DOCUMENTS

| 61-266434 | 11/1986 | Japan . |
| 62-131029 | 6/1987 | Japan . |

Primary Examiner—Mark Nagumo
Attorney, Agent, or Firm—Oliff & Berridge, PLC

[57] ABSTRACT

A polyaniline is characterized by a nuclear magnetic resonance spectrum in its leuco form showing only two $^{13}C$ peaks, indicating the substantial absence of chain branching, and preferably by a molecular weight ($M_p$) above 90,000 and up to about 170,000 (more especially 100–140,000). Oriented films of such polyanilines in the protonated emeraldine oxidation state have electrical conductivities up to at least around 500 S/cm.

They may be made by oxidizing aniline in aqueous solution with a persulfate under the combination of conditions that the acidity of the solution throughout the reaction is such that if its temperature is adjusted to 20° C. it will have a pH in the range from about −0.2 to +3.0;

that the temperature of the solution is in the range from −5° to about −40° C.;

that the solution contains at least sufficient inert ionic solute to maintain it in the liquid state; and that the persulfate is added to the solution always at a rate corresponding to a total addition time of at least six hours (but preferably not over 36 hours) and in a molar ratio to the aniline in the range from 1.1:1 to 1.4:1.

10 Claims, 13 Drawing Sheets

POLYANILINES AND THEIR MANUFACTURE

RELATED APPLICATIONS

This is a continuation-in-part of our international application PCT/GB95/00385, published by the International Bureau under the number WO95/23822 (with a Statement Under Article 19) and notified to the USPTMO as a designated and elected state.

BACKGROUND OF THE INVENTION

1. Field of the Invention

This invention relates to polymers of the polyaniline class and to their manufacture. Polyanilines exist in at least three oxidation states (some authors recognise additional intermediate forms); the emeraldine form is particularly interesting as it is electrically conducting when suitably doped into a "salt" form (with a positive charge on the polymer backbone balanced by negative charges on adjacent ions), but the reduced leucoemeraldine form and the oxidised pernigraniline form (as well as the emeraldine form) have physical properties that may justify commercial application.

2. Prior Art

The best conventional route for synthesis of polyanilines (and substituted polyanilines) is by oxidation in an aqueous acid environment with a persulfate or other peroxy compound (for example, Abe et al, J Chem Soc, Chem Commun 1989 1736–38; Monkman et al, Synthetic Metals 40 87). A group including A G MacDiarmid and S K Manohar (in a conference paper only briefly reported in Bull Amer Phys Soc 1992 37 p506, and in WO93/09175) has suggested that higher molecular weights can be achieved by adding a salt, such as lithium chloride, or an acid to the reaction mixture, partly to allow the reaction temperature to be reduced and partly to increase the polarity (ionic strength) of the medium, but has reported (Synthetic Metals 55–57 (1993) 977–982)) that the effect on conductivity is insignificant. EP-0361429 recommends that the oxidising agent should be added dropwise to avoid the temperature rising above 5° C. WO90/10297 recommends dropwise addition of extra oxidant after the reaction has peaked, presumably to prolong the reaction time. U.S. Pat. No. 5,008,041 proposes to oxidise a mixture of aniline and its dimer, and claims that extremely high molecular weights result. Some of these workers have used an essentially stoichiometric 1.25:1 molar ratio of oxidant to aniline; others have preferred to use an excess of aniline despite the reduced yield that this entails; in particular, Armes and Miller (Synthetic Metals 22 385–393 (1988)) have proposed that the ratio should not exceed about 1.15:1. EP-0605877 proposes to control (that is to limit) the molecular weight of the product by adding both the reagents to the reaction vessel gradually at controlled rates. Milton et al (J Phys D; App Phys 26 (1993) 1468–74) have recognised the function of N-methyl-2-pyrrolidone as a plasticiser in polyanilines.

As the paper already cited from *Synthetic Metals* 55–57 acknowledges, the conventional method of estimating molecular weights of polyanilines by gel permeation chromatography using polystyrenes as reference polymers gives quite inaccurate results; this is particularly so in the presence of lithium chloride as it leads to discoloration of N-methyl-2-pyrollidone, the most practicable solvent. We have found that significantly more trustworthy estimates can be obtained by using poly-2-vinylpyridine reference polymers, and that the molecular weights of conventionally prepared polyanilines measured in this way are much lower than claimed in the literature, and with a few exceptions below 50,000. (For simplicity, molecular weights quoted in this application are "$M_p$" values, that is molecular weights corresponding to the maximum intensity in the observed peak of the gel-permeation chromatography trace; provided that peaks can be resolved, the technique permits number-average and weight-average molecular weights ($M_n$ and $M_w$ respectively) to be estimated, but only by integration of the trace; $M_p$ values are considered sufficiently characterising for present purposes).

BRIEF SUMMARY OF THE INVENTION

The present invention arose from a development programme (conducted in the Department of Physics of the University of Durham and in the laboratories of High Force Research) in which the inventors have found that oriented polyaniline films can be made with a much more linear structure (and significantly higher molecular weights), in consequence of which they have improved physical properties and significantly higher conductivities in the orientation direction of oriented film, and have established processes by which such polyanilines can be produced. Some of the polyanilines made in accordance with the present invention have molecular weights around 130,000 and achieve conductivities (in the orientation direction of oriented films) better than 500 S/cm.

In accordance with one aspect of the invention, a polyaniline is characterised by a nuclear magnetic resonance spectrum in its leuco form showing only two $^{13}C$ peaks, indicating the substantal absence of chain branching.

Preferred polyanilines in accordance with the invention have a molecular weight ($M_p$) above 90,000 and up to about 170,000 (more especially 100,000 to 140,000).

The invention includes a preferred method of making such a polyaniline comprising oxidising aniline in aqueous solution with a persulfate and is characterised by the combination of conditions that the acidity of the solution throughout the reaction is such that if its temperature is adjusted to 20° C. it will have a pH in the range from about −0.2 to +3.0; that the temperature of the solution is in the range from −5 to about −40° C.; that the solution contains at least sufficient inert ionic solute to maintain it in the liquid state; and that the persulfate is added to the solution always at a rate corresponding to a total addition time of at least six hours and in a molar ratio to the aniline in the range from 1.1:1 to 1.4:1.

Preferably the addition of the persulfate does not occupy a period greater than 36 hours.

As used herein, the term "polyaniline" means a homopolymer of aniline itself, that is to say the use of polyanilines derived wholly or in part from one or more than one substituted aniline is excluded.

DETAILED DESCRIPTION

Figure 1:
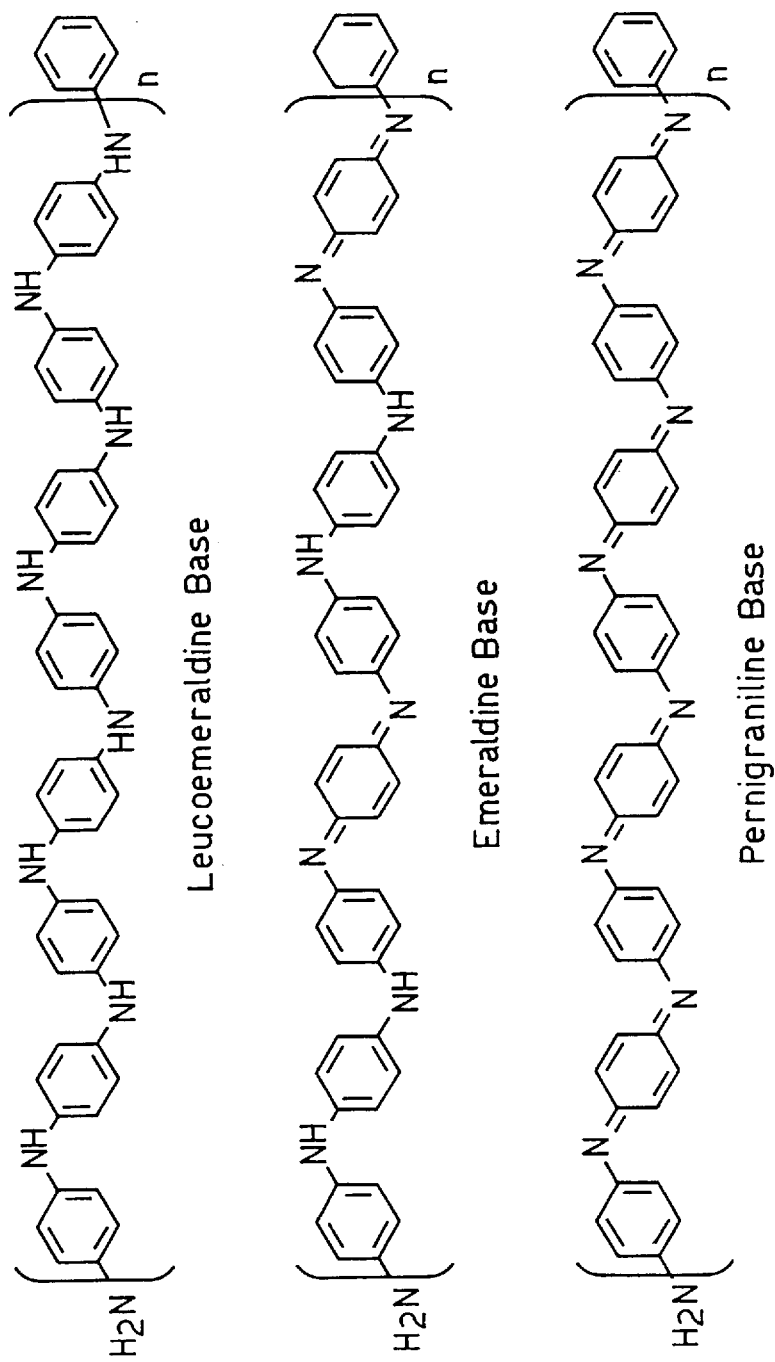
FIG. 1 represents the structures of the three principal oxidation states of polyaniline.

The acidity of the solution can be controlled by regulating the starting concentrations of the ingredients and (if necessary) the reaction time, by buffering, or by use of a drip-feed of pH adjusting additive regulated by calculation based on the expected state of reaction or on measurements of the pH of the solution (which will normally require the use of solution samples extracted and warmed to 20° C. or some other temperature at which pH electrodes work reliably). If there is a sufficient concentration of chloride, it is considered sufficient to control the starting pH, as the tendency to form molecular HCl under the reaction conditions prevents the acidity rising much above that corresponding to a pH of −0.2. Preferably the starting acidity is in the approximate range corresponding to a pH from −0.1 to 1.0. If the acidity is too great, yield of polyaniline is low, at least partly because side-reactions such as ring chlorination occur; if it is too low, polymerisation fails to initiate.

Preferably the temperature is in the range between −10° and −34° C. (more especially between −25° and −30° C., with an estimated optimum temperature about −26° C.) throughout the reaction. Satisfactory results are obtained with the temperature held substantially constant in the specified range, but the Applicants consider it possible that there may be merit in varying the temperature in the course of the reaction (for instance slowly reducing it). If the temperature is too high, the linearity and conductivity of the polyaniline will be inadequate and its molecular weight low; if it is too low, the reaction may cease or proceed too slowly.

Very few inert ionic solutes are available, and (except when the pH is near the bottom of its permitted range and the temperature near the top of its permitted range, when hydrochloric acid may suffice) we recommend lithium chloride, magnesium chloride or sodium chloride. The oxidation reaction will not proceed if the solution freezes, and high ionic strength favours the desired long reaction times.

Slow addition of the persulfate is presumed to help increase molecular weight by favouring chain growth over chain initiation. Preferably the rate of addition is uniformly slow and preferably addition takes a period of 12 to 24 hours. Within the range specified, a higher ratio of persulfate to aniline favours high yield but a lower ratio a higher molecular weight. Ratios higher than about 1.3 appear to risk oxidation to the pernigraniline state, evidenced by purple rather than pale blue colouration in the filtrate after separation of the polyaniline. We therefore prefer to use a ratio in the range 1.15 to 1.3, with particular preferences for the range 1.2 to 1.3 or for maximum molecular weight 1.15 to 1.2. High molecular weight is usually desirable as contributing to maximum conductivity, but on the other hand may sometimes be undesirable as it reduces compatibility with other polymers, if it should be desired to use mixtures.

Preferably the film is oriented by stretching it in the presence of a substantial residue (preferably about 10–30% by weight, with the optimum at the top of the range) of solvent as plasticiser. Suitable solvent plasticisers are N-methyl-2-pyrollidone, tetramethyl urea and 1,3-dimethyl imidazolidone (also called 1,3-dimethyl imidazolidinone). N-methyl-2-pyrollidone (NMP) is much preferred.

The optimum degree of orientation needs to to be determined by trials depending on the molecular weight and other variables; for the preferred polyanilines in accordance with the invention, this optimum corresponds to an elongation of about 600%.

The following examples illustrate the invention with reference to the accompanying drawings. FIG. 1 shows for reference the structural formulae of perfectly regular polyanilines in the leucoemeraldine, emeraldine and pernigraniline oxidation states respectively.

COMPARISON EXAMPLE A

One tenth of a mole (12.96 g) of aniline hydrochloride was dissolved in 150 ml of distilled water and stirred in a beaker at ambient temperature (about 18° C.); to this a solution of 0.125 moles (28.5 g) of ammonium persulfate in 80 ml of distilled water was added dropwise over a period of 4 hours, and stirring continued for a further 20 hours. The reaction mixture was then filtered and the residue washed three times with 100 ml of distilled water and stirred in 100 ml of 33% aqueous ammonia for 8 hours to deprotonate the polyaniline product before refiltering and washing twice with 200 ml of distilled water and once with 100 ml of isopropanol. On drying under vacuum at 60° C., polyaniline with a molecular weight ($M_p$) of about 40,000 was recovered in its emeraldine base form at a yield of about 90%.

This polyaniline was dissolved in N-methyl-2-pyrrolidone at 10% solids concentration and homogenised in a centrifuge for an hour at 4000 rpm before decanting the solution to remove any fine particles. The solution was coated on glass to give a coating weight of about 0.03 g/cm$^2$ and solvent partially removed by heating at 60° C. under vacuum for about an hour. The coating was peeled from the glass to form a self-supporting film containing about 25% of N-methyl-2-pyrrolidone; samples around 2 by 3 cm were cut from it for orienting.

These samples were clamped at their narrow ands and the two clamps biassed apart with a tension of about 5N while the temperature was raised from ambient to 60° C. This produced an elongation of about 200% and a substantial degree of uniaxial orientation. The oriented film was then protonated by exposure to 10% aqueous hydrochloric acid for 24 hours. Conductivities in the plane of the film in and perpendicular to the orientation direction were measured using a standard 4-point probe and calculating by means of van der Pauw's/Montgomery's equations, and were found to be 102 S/cm and 61 S/cm respectively (compared with values around 80 S/cm for similar film in the unoriented state).

COMPARISON EXAMPLE B

Another sample of polyaniline emeraldine base was prepared following the procedure set out by A M Kenwright et al, *Polymer* 33(20) pp 4292–98 (1992). A 2 g sample of this was placed in a 250 ml beaker with 20 g of a grade of N-methyl-2-pyrrolidone (NMP) intended for high-performance liquid chromatography (hplc). The mixture was stirred and then subjected to ultrasonic vibrations for 15 minutes to ensure adequate dispersion of the emeraldine base. Next, 2.5 g of phenylhydrazine was added and the mixture stirred for 24 hours at room temperature, by which time it had turned dark brown. The beaker was now introduced into a nitrogen-atmosphere glove box and the contents added to a large excess of toluene, with vigorous stirring, to precipitate leucoemeraldine, which was recovered by filtration, washed four times with toluene, dried on the Buchner funnel and transferred to a dessicator, which was evacuated and removed from the glove box. Dynamic vacuum was applied for two days to minimise residual toluene. The dessicator was returned to the glove-box and the leucoemeraldine ground with a pestle and mortar, giving a light-tan coloured powder.

Samples were prepared for NMR observations by mixing about 0.4 g of the powder with 4 g of a mixture of nominally equal volumes of NMP and fully deuterated dimethylsulphoxide ($d_6$DMSO). The mixture was subjected to ultrasonic vibrations for 15 minutes to ensure dispersion and transferrd to a 10 mm diameter NMR sample tube, which was capped and sealed with hydrocarbon film (sold under the trademark PARAFILM). The $^{13}C$ spectrum was obtained using a Bruker AMX-500 spectrometer at an operating frequency of 125.77 MHz, a 10 mm decoupler coil and a nominal probe temperature of 303 K. Chemical shift values were computed in relation to tetramethylsilane (TMS) on the basis that the $d_6$DMSO peak was at +39.5 ppm.

The results of this measurement will be discussed with Example 8 below.

EXAMPLE 1

One fifth of a mole (25.92 g) of aniline hydrochloride was dissolved with 1.65 moles (70 g) of lithium chloride in 300 ml of distilled water and placed in a jacketed reaction vessel fitted with a mechanical stirrer and cooled by circulating fluid at −30° C. When the temperature had fallen to −28° C., dropwise addition of a solution of 0.25 moles (57.05 g) of ammonium persulfate in 160 ml of distilled water was begun using a peristalic pump to achieve a mean rate of addition of 20 ml/hr (addition time about 8 hours); stirring continued for a total of 23 hours from the beginning of addition. The temperature remained substantially constant at −28° C. throughout the reaction and the pH remained between 1.3 and 0.0. The resulting dark green reaction mixture was filtered and the residue washed three times with 300 ml of distilled water and then stirred in 33% aqueous ammonia solution for 8 hours. The mixture was again filtered and the residue washed twice with 300 ml of distilled water and once with 300 ml of isopropanol (yield after drying 95%). This was processed into oriented and protonated film using the same procedure as for Comparison Example A, except that (because of the higher solution viscosity reflecting a molecular weight ($M_p$) estimated as 107,000 by gel permeation chromatography using poly-2-vinylpyridine reference polymers in a solution containing 0.1% lithium chloride in N-methyl-2-pyrrolidone) the concentration of the coating solution was only 7%. At an elongation of 200%, the conductivities were measured as 303 S/cm and 133 S/cm in the longitudinal and transverse directions, compared with a value of about 100 S/cm in the unoriented state. It should be noted that the improvement in conductivity in the unoriented state is relatively small and that the anisotropy of the oriented film is substantially greater than that of the Comparison Example A.

A second sample was processed similarly except that it was protonated in 15% methyl sulfonic acid instead of in hydrochloric acid: this had conductivities of 403 S/cm and 194 S/cm in the longitudinal and transverse directions in the oriented state, compared with about 120 S/cm in the unoriented state. This sample was 0.016 mm thick.

EXAMPLES 2–7

The procedure of Example 1 was repeated with variations in the reaction conditions as detailed in Table 1 below, except that in most cases only methyl sulphonic acid was used in the protonation step. Ammonia was used to reduce acidity when required. Resulting properties were as shown in Table 2.

TABLE 1

| Example no. | Temperature (°C.) | Solute | Reaction time (h) | pH range |
|---|---|---|---|---|
| 2 | −5 | 8% MgCl$_2$ | 22 | 2.2–0.7 |
| 3 | −9 | 10.2% LiCl | 23 | 1.9–0.0 |
| 4 | −15 | 15.0% MgCl$_2$ | 48 | 2.0–0.0 |
| 5# | −18 | 14.3% LiCl | 23 | 1.5–0.0 |
| 6 | −23 | 15.0% LiCl | 23 | 2.5–0.0 |
| 7# | −33 | 23.5% LiCl | 67 | 2.6–0.3 |

In Example 5, the film elongation was 220% and in Example 7 only 170%, not 200% as in the other Examples in this Table

TABLE 2

| Example No. | yield (%) | $M_p$ | Protonator | Conductivities* a | b | c |
|---|---|---|---|---|---|---|
| 2 | 97 | 90,000 | MeSO$_3$H | 99 | 228 | 111 |
| 3 | 94 | 94,000 | MeSO$_3$H | 100 | 299 | 159 |
| 4 | 104? | 117,000 | MeSO$_3$H | 104 | 274 | 137 |
| 5 | 95 | 124,000 | MeSO$_3$H | 103 | 316 | 141 |
| 6 | 95 | 100,000 | MeSO$_3$H | 123 | 367 | 177 |
|   |   |   | HCl | 108 | 323 | 145 |
| 7 | 92 | 107,000 | MeSO$_3$H | 75 | 246 | 132 |

*a in the unoriented state, b in the longitudinal direction and c in the transverse direction, both in the oriented state.

The product of Example 2 was processed to leucoemeraldine form and NMR measurements made following the same procedure as described in connection with Comparison Example B; the result will be discussed below with the next Example.

EXAMPLE 8

One tenth of a mole (9.31 g) of aniline was dissolved together with 0.61 moles (25.8 g) of lithium chloride in 100 g (about 0.1 mole) of 1M hydrochloric acid. The pH was adjusted to 1.0 and the solution placed in a jacketed reaction vessel fitted with a mechanical stirrer and cooled to about −30° C. by circulating fluid at that temperature. A solution of 0.125 moles (28.52 g) of ammonium persulfate in 51.48 g of water was added dropwise to the cooled reaction mixture by means of a peristaltic pump at a flow rate of approximately 5 ml/h (addition time about 14 hours) and stirring continued for a total of 45 hours from the beginning of addition. The temperature remained about −30° C. throughout the reaction.

The resulting dark green reaction mixture was filtered and the residue washed 10 times, each time with 200 ml of water and then stirred in 100 ml of 33% aqueous ammonia for 24 hours. The mixture was again filtered and the residue washed 8 times, each time with 200 ml of water and then twice, each time with 200 ml of isopropanol and then dried under vacuum at 60° C. for 24 hours, to give a yield of 95%. The molecular weight ($M_p$) of this polymer was estimated as 124,000 by gel permeation chromatography at 80° C. using poly-2-vinylpyridine reference polymers in a solution containing 0.1% lithium chloride in N-methyl-2-pyrollidone.

Figure 2:
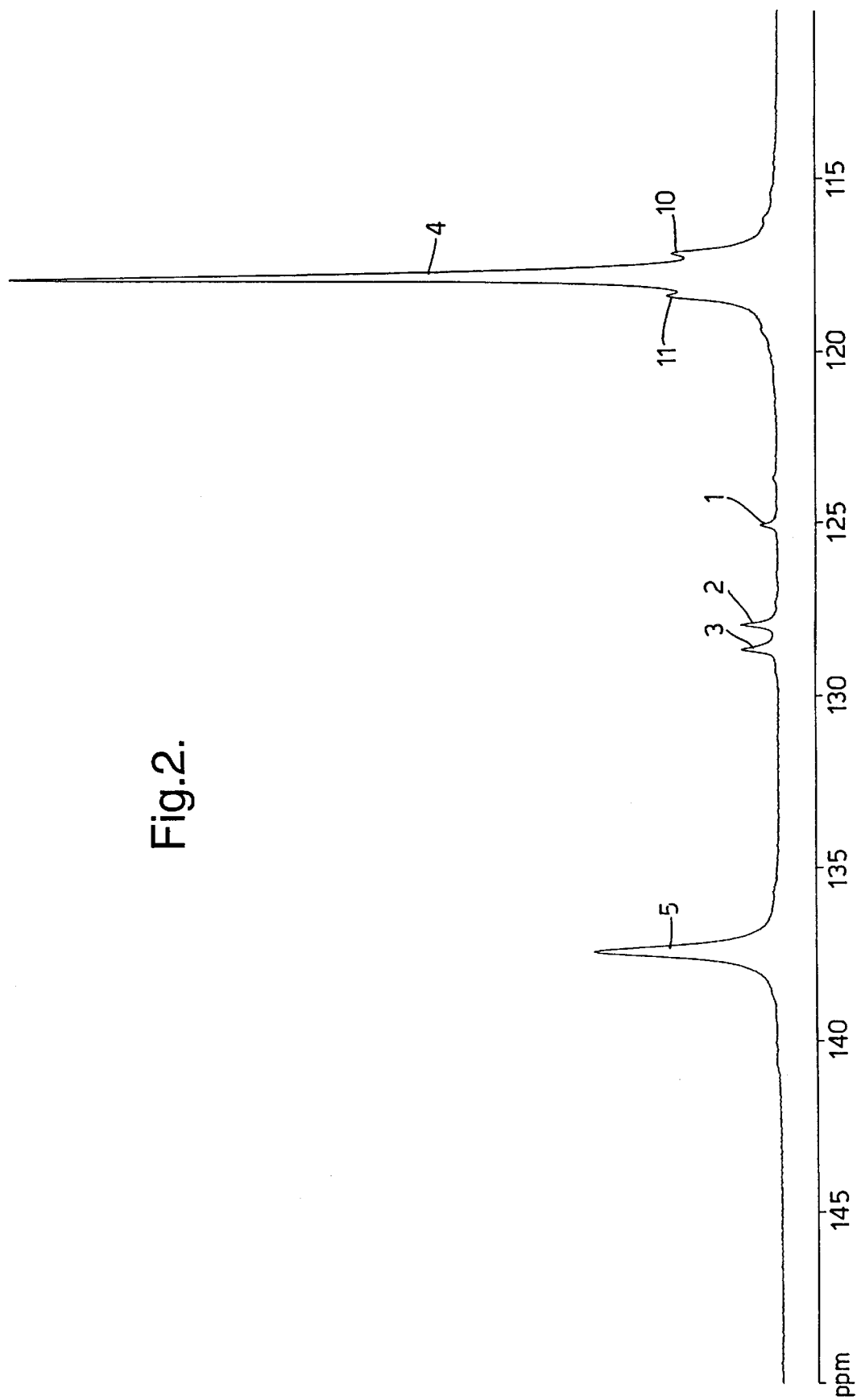
FIG. 2, FIG. 4 and each of FIGS. 6–13 is an NMR spectrum of a different sample of leucopolyaniline in accordance with the invention.
Figure 3:
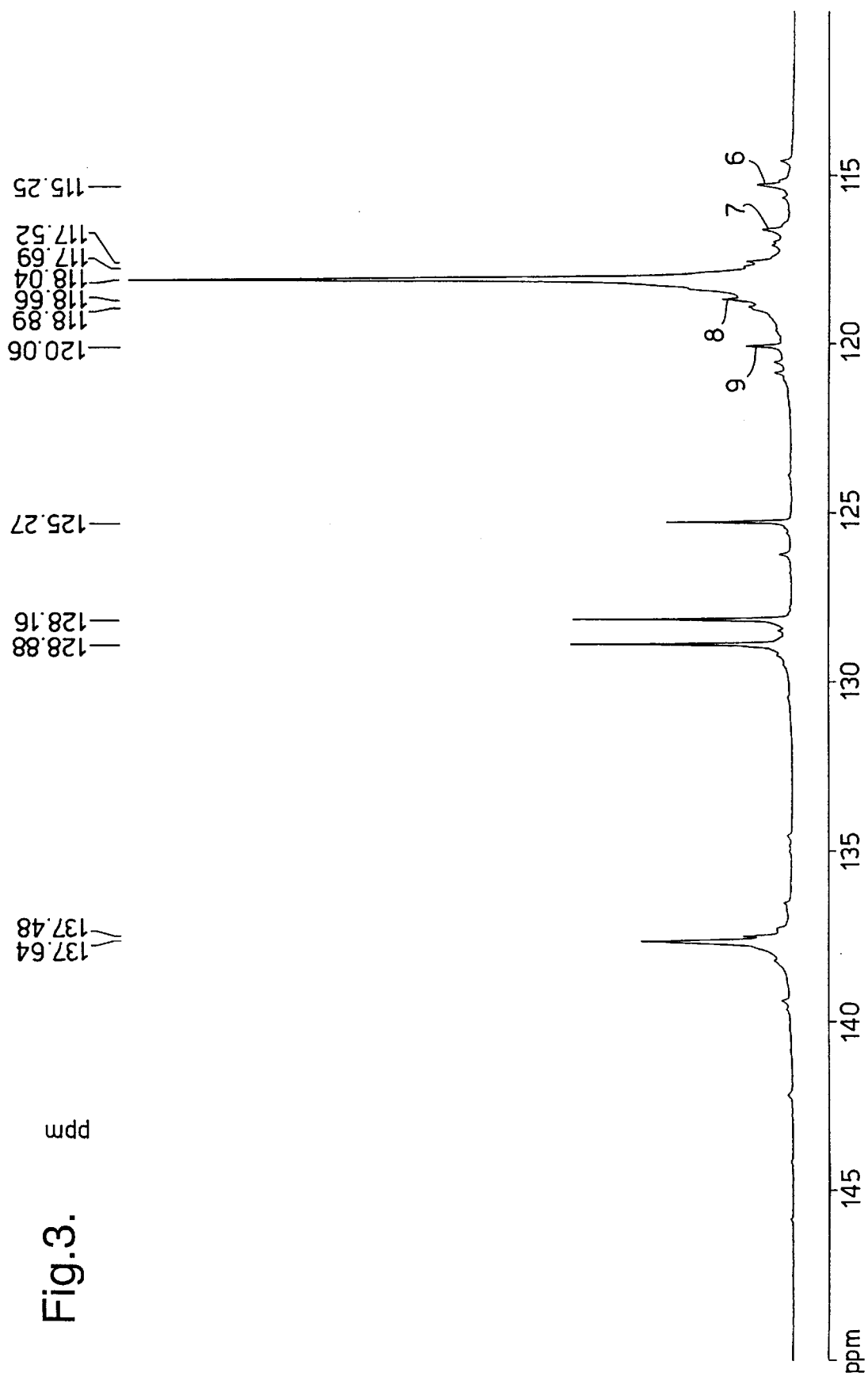
FIG. 3 an equivalent spectrum for a conventionally prepared polyaniline.
Figure 4:
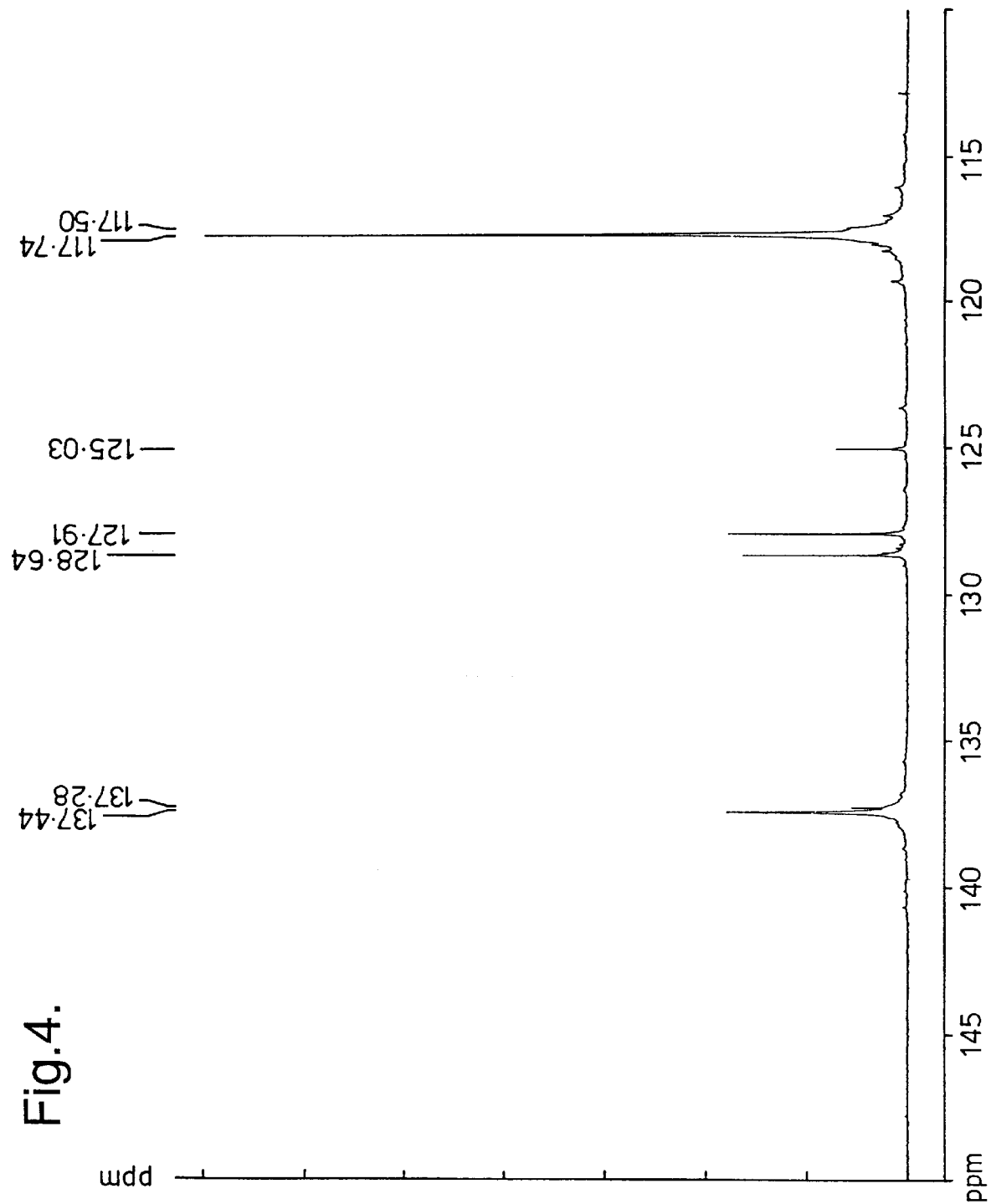

A sample of this polymer was processed to leucoemeraldine form and NMR measurements made following the same procedure as in Comparison Example B (except that the concentration was 5% to allow for the increased molecular weight), and the resulting trace is reproduced in FIG. 2; an equivalent trace for the Comparison Example B is given in FIG. 3 and for Example 2 in FIG. 4.

In each of these figures, there are minor peaks 1, 2 and 3 respectively at about 125, 128 and 129 ppm, which are attributed to residual toluene (from which a further peak at 137.5 ppm can be inferred). Otherwise, there are major peaks 4 and 5 respectively at 118 and 137 ppm (the latter masking the inferred toluene peak) in both cases due to the regular leucoemeraldine structure. In FIG. 2 (the polymer of Example 8) there are no other substantial peaks—the shoulders 10,11 seen on the major peak at 118 ppm are attributable to spinning side-bands (as are small symmetrical satelite peaks in some of the other figures) and there is some peak broadening attributed to gelling of the solution—but in FIG. 3 (the conventionally prepared polymer) there are small but significant peaks 6, 7, 8, 9 at about 115, 116.5, 119 and 120 ppm, which we attribute to chain branching and other structure defects (including end effects, but comparison with FIG. 1 suggests that end-effects are minimal). Quantitative analysis of similar traces obtained with the decoupler coil gated off during a 30-second recycle period indicates that after allowing for the residual toluene, the areas of the two major peaks are in a ratio of 2:1 within experimental error and account for about 95% of the intensity in the 110–160 ppm region in FIG. 2 and 99% in FIG. 1. These percentages may be taken as rough estimates of the regularity of the respective polymer structures.

FIG. 4 is similar to FIG. 2 but with a few very small additional peaks attributable to defect structures below the 1% level.

An attempted $^1$H NMR spectrum recorded on the same 10 mm decoupler coil for the product of Example 8 was of poor resolution but was consistent with the presence of two major peaks at 6.98 and 7.51 ppm with an intensity ratio of 4:1.

Figure 5:
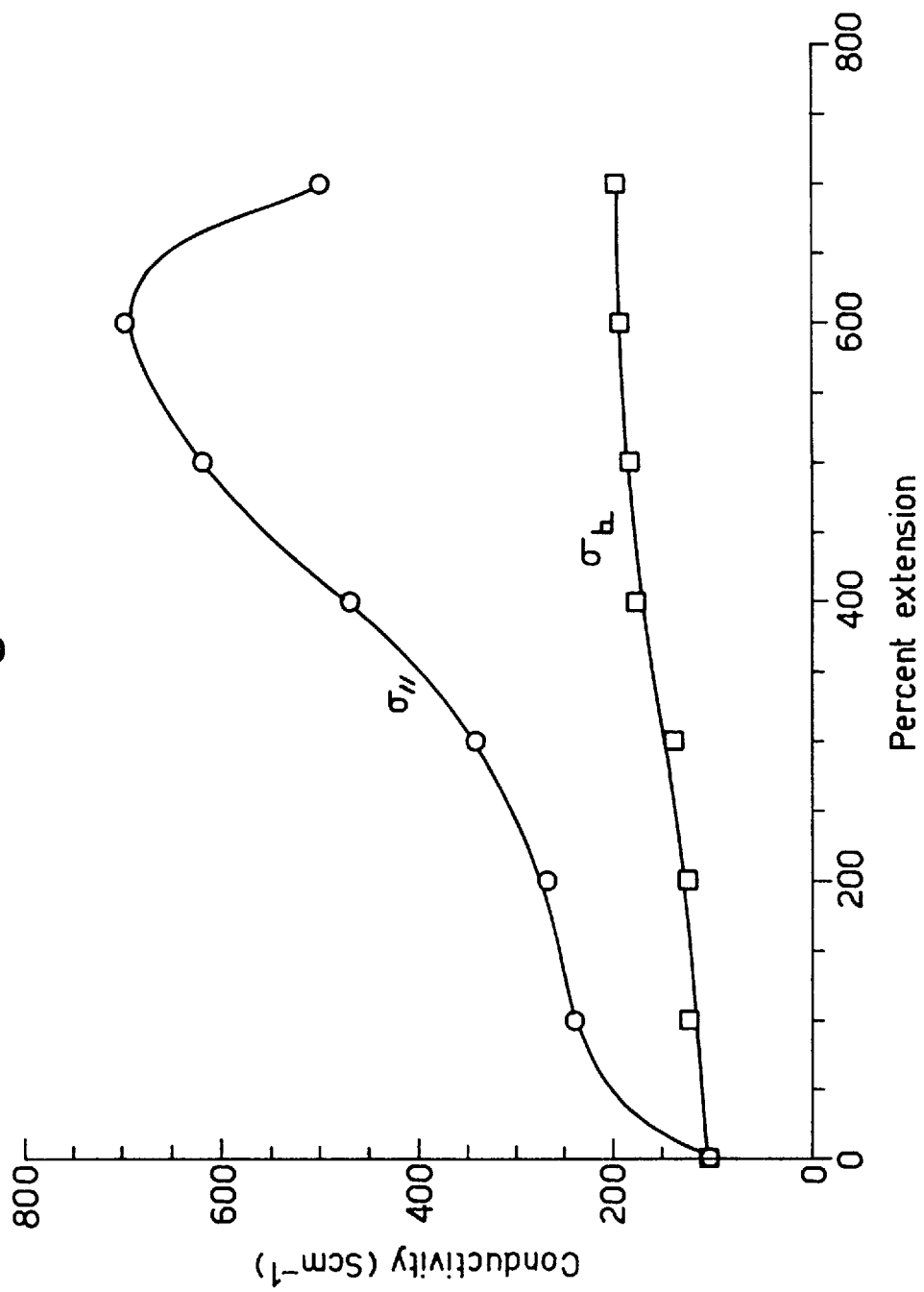
FIG. 5 is a graph of conductivity against elongation for one sample of polyaniline in accordance with the invention in oriented film form.

The polymer of Example 8 was processed into film generally as in the preceding Examples, using a coating solution with 7% solids to form a coating weight of 0.05 g/cm$^2$. The orientation procedure was refined to permit higher elongations to be obtained, first by folding the longitudinal edges of the film twice over on themselves to strengthen the edges and resist fracture and secondly by using paper liners in the metal gripping jaws of the tensioning apparatus. The folded edges were trimmed off before measurements were made. A range of extensions could then be obtained by preheating the film to a temperature of about 80°–90° C. and applying whatever tension was required to stretch slowly to the required extent. In all cases protonation was by soaking in 10% HCl for 24 hours. Film thicknesses, conductivities and electrical anisotropy (the ratio of conductivities in the longitudinal and transverse directions) were measured as in Table 3 and graphed in FIG. 5:

TABLE 3

| Extension | Thickness | Conductivities (S/cm) | | anisotropy |
|---|---|---|---|---|
| (%) | (mm) | b | c | b/c |
| 0 | 0.040 | 102 | 102 | 1.0 |
| 100 | 0.035 | 239 | 123 | 1.9 |
| 200 | 0.033 | 268 | 121 | 2.2 |
| 300 | 0.031 | 392 | 138 | 2.5 |
| 400 | 0.030 | 469 | 176 | 2.7 |
| 500 | 0.026 | 619 | 183 | 3.4 |
| 600 | 0.025 | 699 | 192 | 3.6 |
| 700# | 0.024 | 501 | 197 | 2.5 | it is thought that the measurement at 700% elongation may be inaccurate due to the difficulty of accurately aligning the probe on highly oriented material, but that the reduction in conductivity observed is almost certainly real.

As clearly seen in the graph, the film of this Example has a conductivity, measured as described, better than 500 S/cm for elongations from about 450 to about 700%.

A deuterated sample oriented to 500% extension was used in neutron-scattering experiments: no evidence of crystallinity was found, whereas conventionally prepared polyanilines show an appreciable degree of crystallinity.

EXAMPLES 9–16

The synthetic procedure of Example 8 was repeated at a range of temperatures using appropriate concentrations of lithium chloride with the starting pH constant at 1.0. The yield and molecular weight were estimated as before, and the results are given in Table 4, along with a comparison example at 0° C. and Example 8 to complete a sequence:

TABLE 4

| Example | Temp (°C.) | [LiCl] (wt %) | Yield (%) | $M_p$ (±10,000) |
|---|---|---|---|---|
| — | 0 | 0 | 89.6 | 75,000 |
| 9 | −10.0 | 8.65 | 92.1 | 94,000 |
| 10 | −15.0 | 11.29 | 92.9 | 117,000 |
| 11 | −20.0 | 13.54 | 94.2 | 112,000 |
| 12 | −22.5 | 14.69 | 93.8 | 109,000 |
| 13 | −25.0 | 15.96 | 97.5 | 119,000 |
| 14 | −26.0 | 16.43 | 94.8 | 130,000 |
| 15 | −27.5 | 17.40 | 100.5 | 117,000 |
| 8 | −30.0 | 19.09 | 94.9 | 124,000 |
| 16 | −35.0 | 23.47 | 89.9 | 117,000 |

Figure 6:
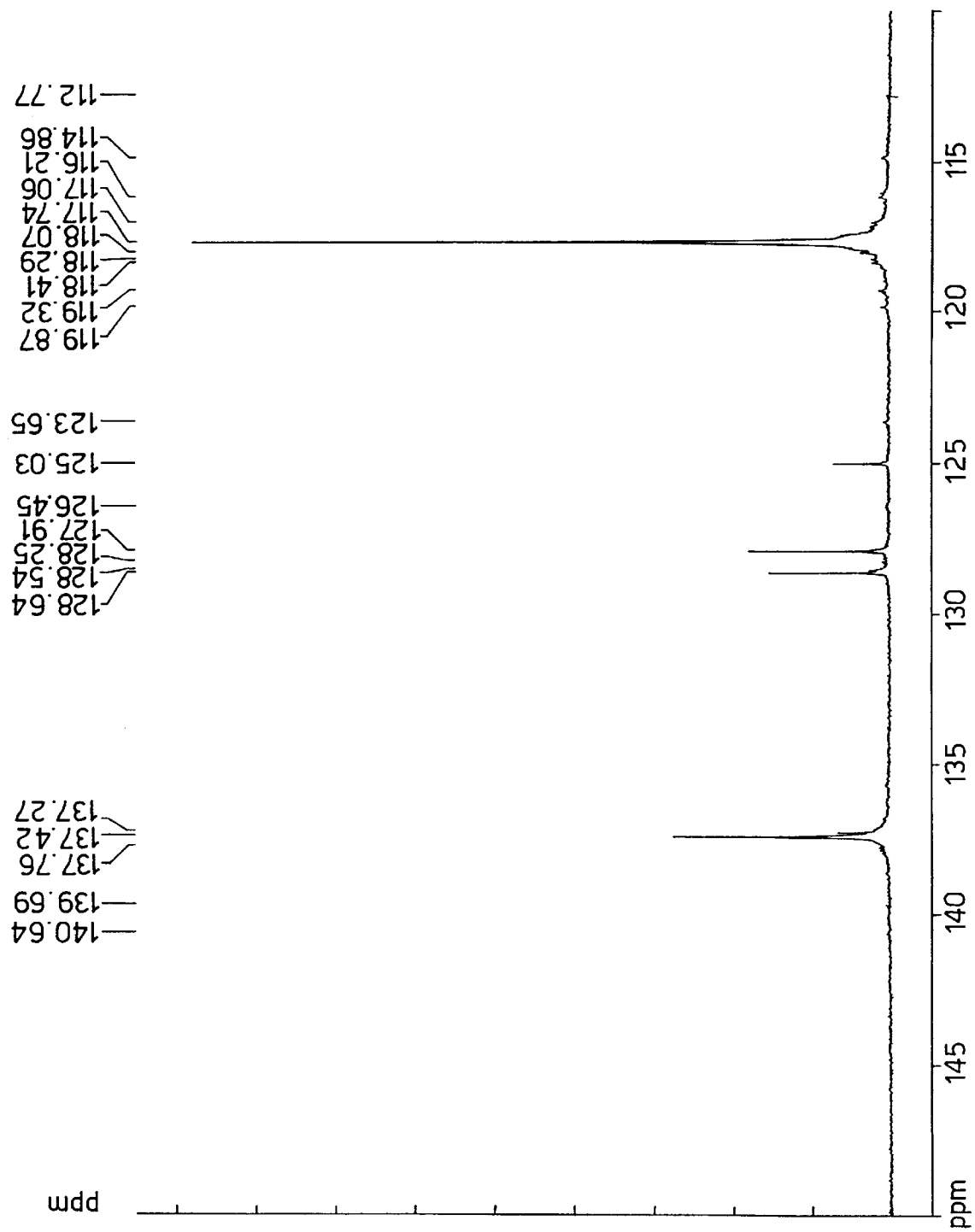
Figure 7:
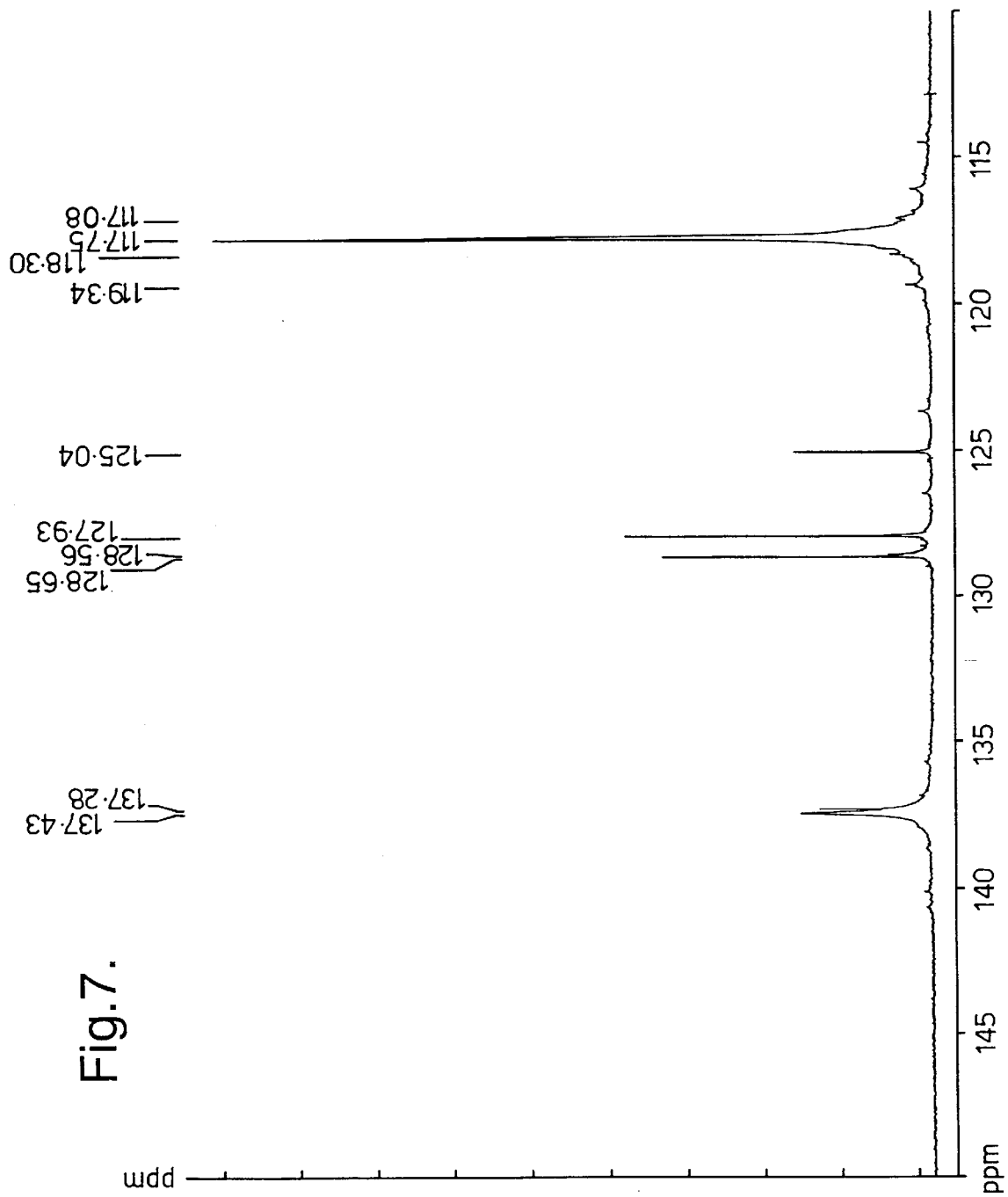

The products of Examples 9 and 16 were reduced to leucoemeraldine form for NMR measurements as before, and the resulting traces are given as FIGS. 6 and 7 respectively.

EXAMPLES 17–22

The procedure of Example 14 was repeated using a range of starting pH values in the range +3 to −0.3 and the results, including Example 14 to complete the sequence, are shown in Table 5 (for positive pH values, the figure shown is that of the starting solution measured at ambient temperature before cooling to the reaction temperature; for negative values, estimated by calculation from the ingredients and allowing for the relatively low degree of dissociation of HCl at this temperature and concentration).

TABLE 5

| Example | Starting pH | Degree of dissociation | Yield % | $M_p$ |
|---|---|---|---|---|
| 17 | +3.0 | 1.00 | 89.7 | 117,000 |
| 18 | +2.0 | 1.00 | 97.4 | 124,000 |
| 14 | +1.0 | 0.96 | 94.8 | 130,000 |
| 19 | 0.0 | 0.72 | 94.6 | 127,000 |
| 20 | −0.11 | 0.65 | 95.6 | 142,000 |
| 21 | −0.23 | 0.56 | 88.9 | 142,000 |
| 22 | −0.30 | 0.40 | 79.3 | 127,000 |

Figure 8:
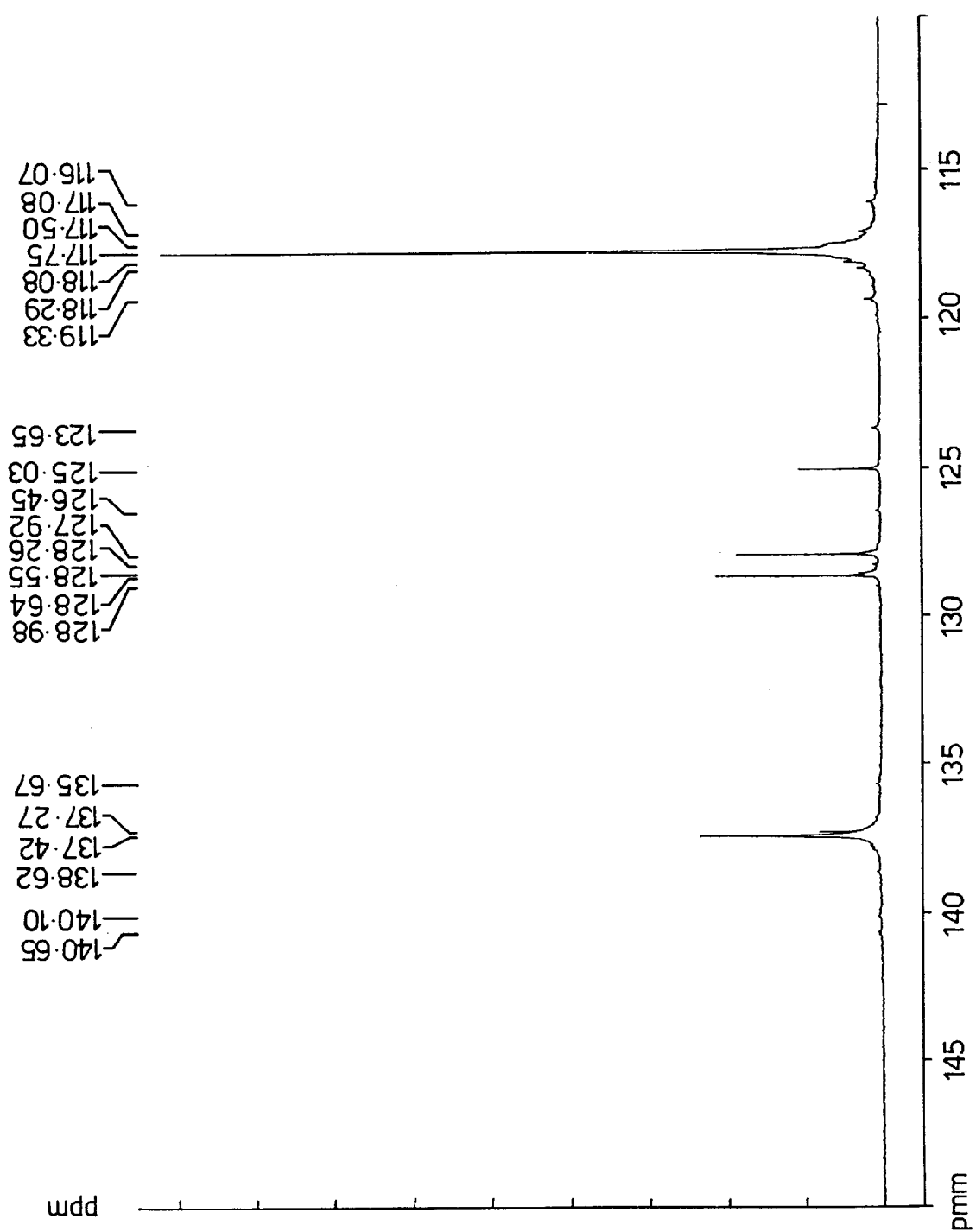
Figure 9:
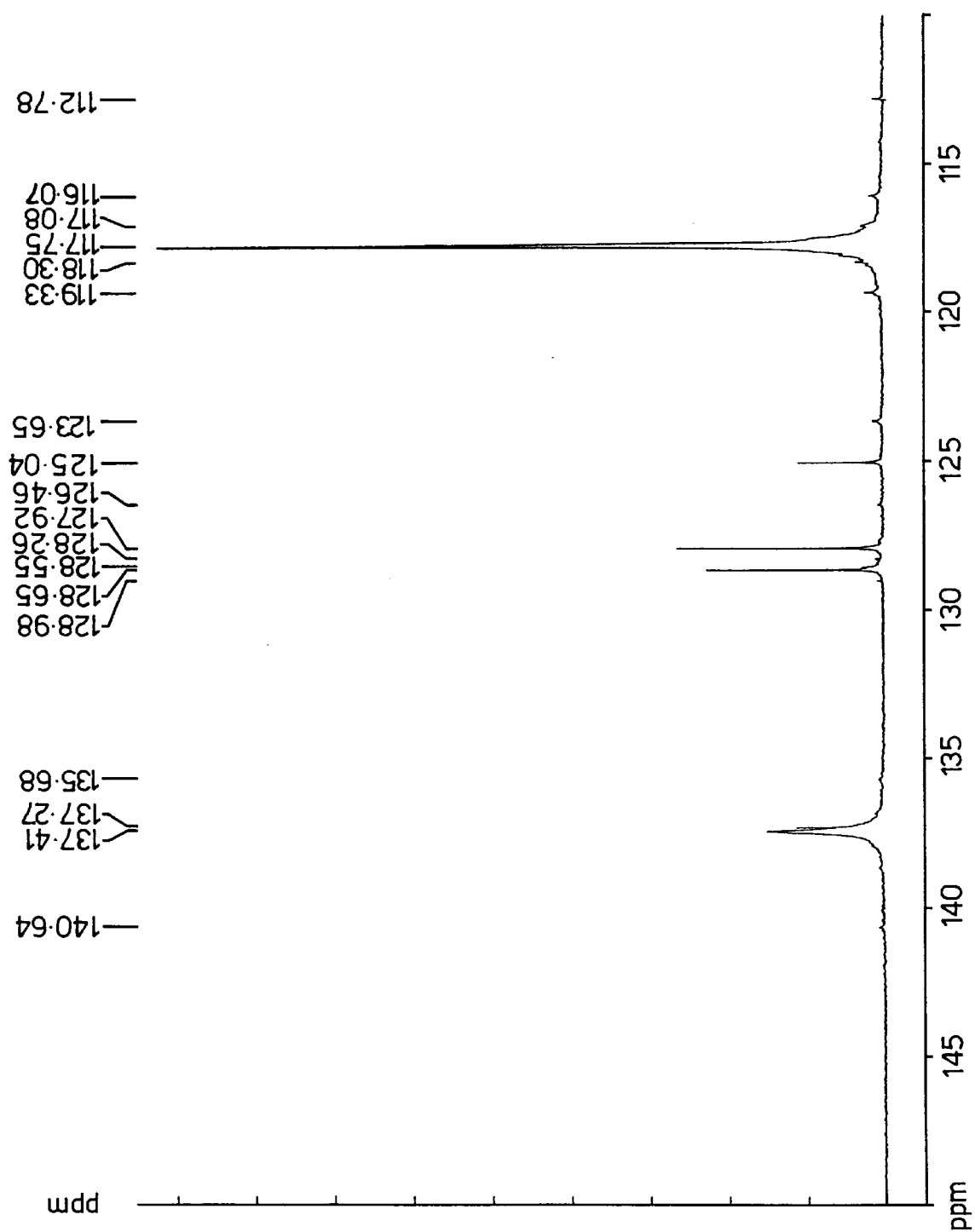

The products of Examples 17 and 22 were reduced to leucoemeraldine form for NMR measurements as before, and the resulting traces are given as FIGS. 8 and 9 respectively.

EXAMPLES 23–27

The procedure of Example 14 was followed, varying the amount of persulfate added over the range from 1 to 1.5 times the molar equivalent of the aniline. The yield, molecular weight and colour of filtrate were as shown in Table 6:

TABLE 6

| Example | Mole ratio | Yield % | $M_p$ | Colour of filtrate |
|---|---|---|---|---|
| 23 | 1.00:1 | 78.9 | 148,000 | colourless |
| 24 | 1.15:1 | 89.7 | 158,000 | pale blue |
| 14 | 1.25:1 | 94.8 | 130,000 | deep blue |
| 25 | 1.30:1 | 94.6 | 117,000 | purple |
| 26 | 1.35:1 | 100.3 | 114,000 | purple |
| 27 | 1.50:1 | 91.3 | 78,000 | dark purple |

In Table 6, the yield is expressed as a percentage of the amount of aniline present; at a molar ratio of 1.0, the yield is very close to the theoretical value of 80% for a pure 2.5-electron reaction. The coloration of the filtrate is presumably due to residual dimers (and possibly other oligomers), blue if in the emeraldine state and purple if oxidised to the pernigraniline state.

Figure 10:
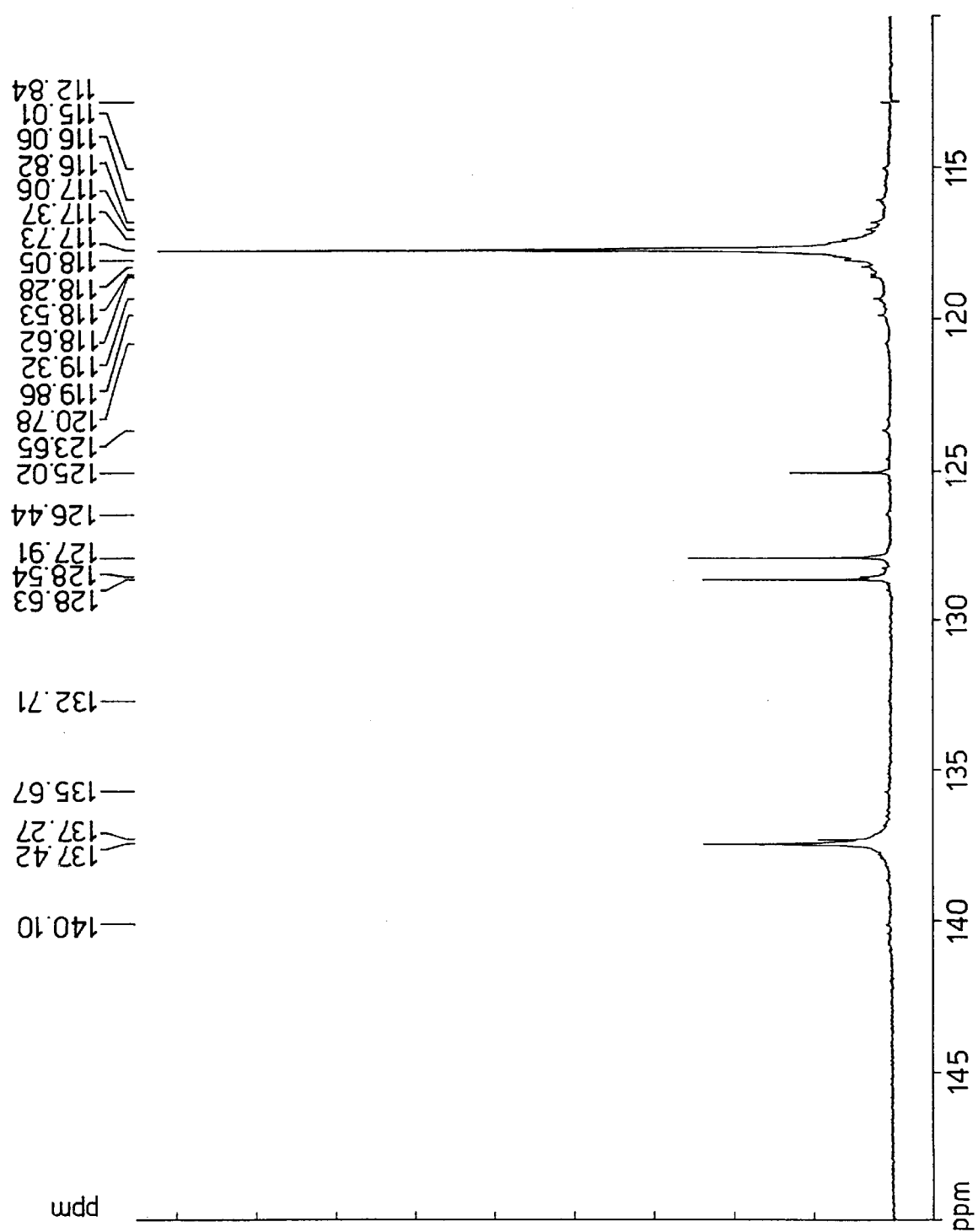
Figure 11:
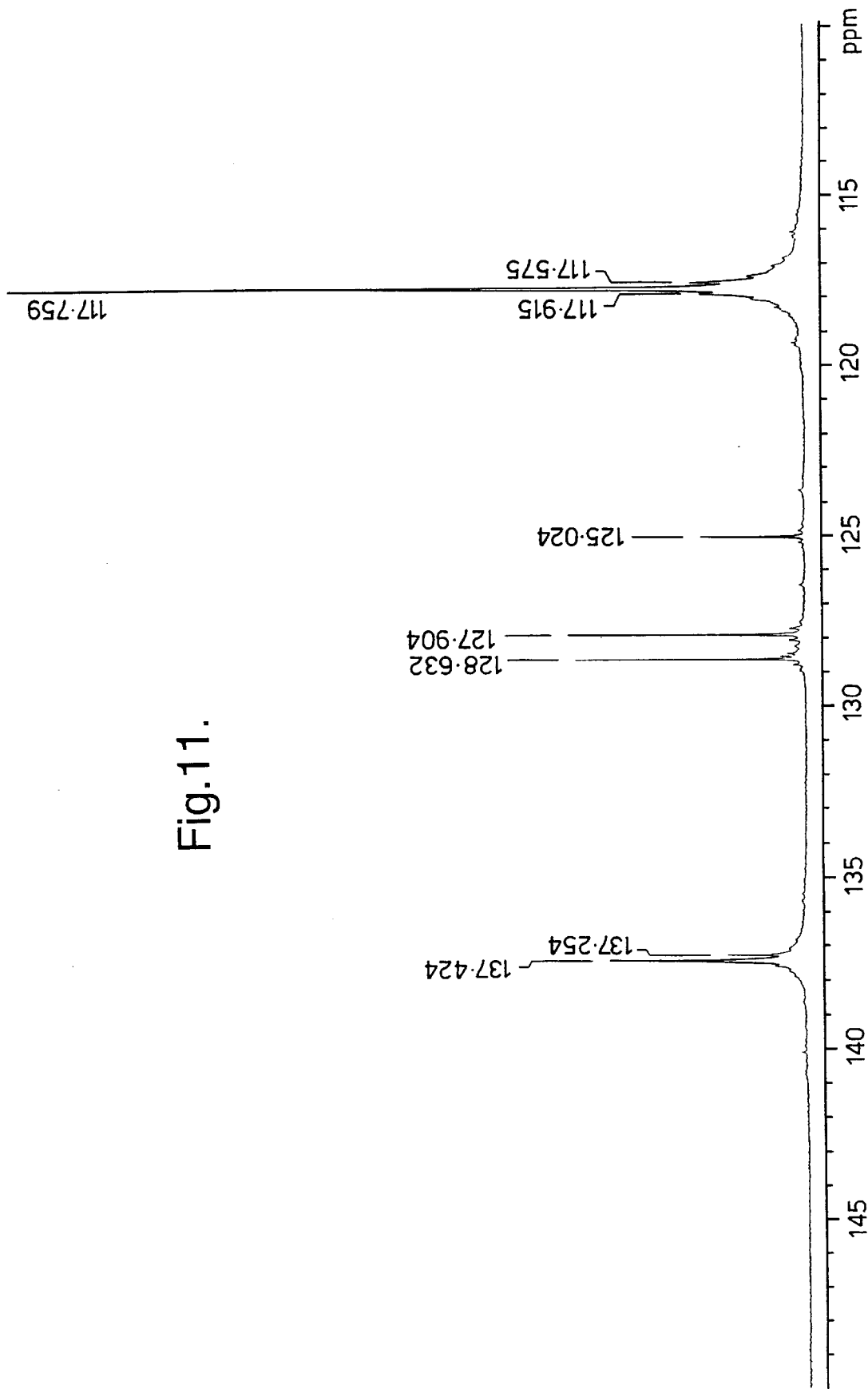

The products of Examples 23 and 27 were reduced to leucoemeraldine form for NMR measurements as before, and the resulting traces are given as FIGS. 10 and 11 respectively.

EXAMPLE 28

Figure 12:
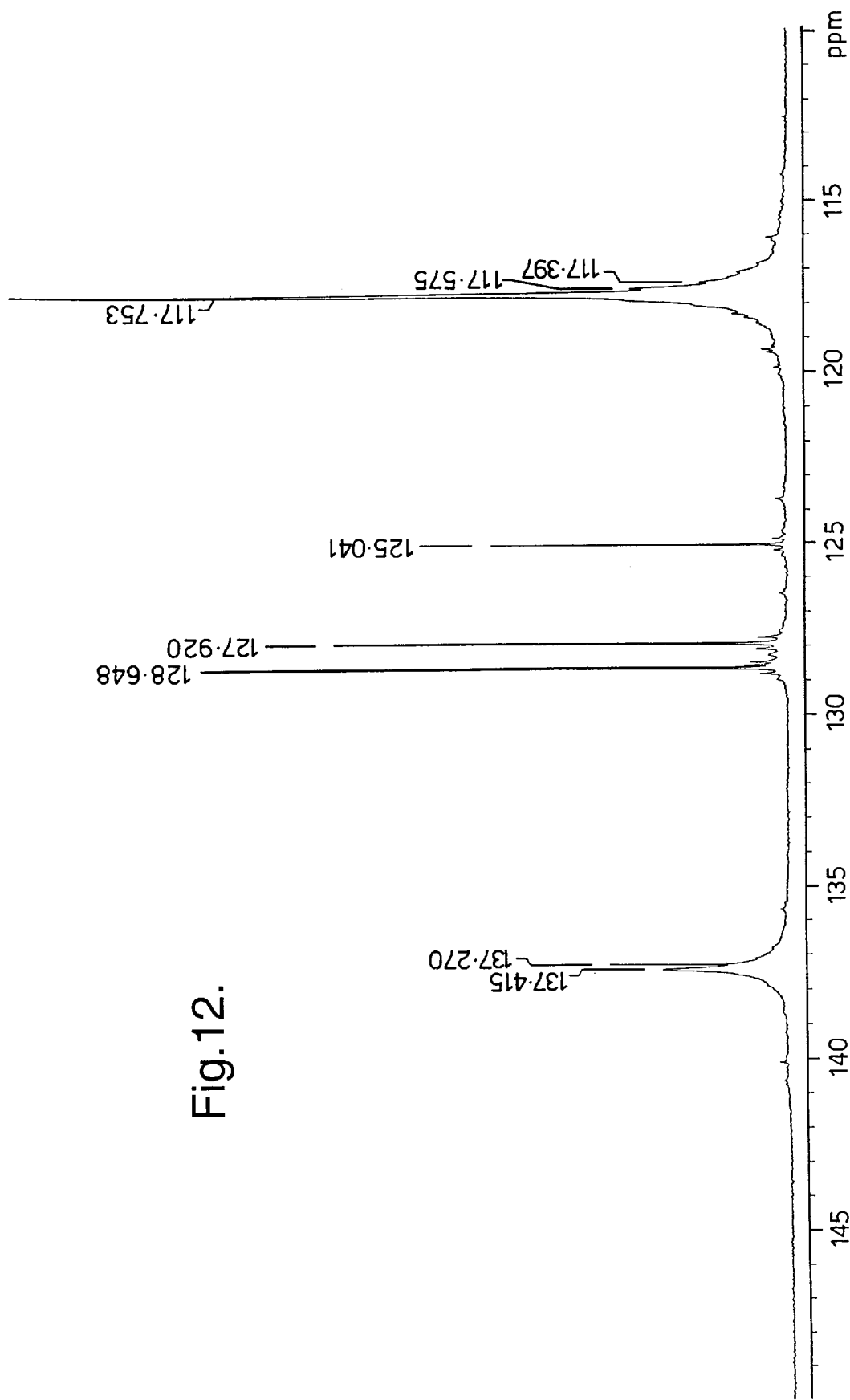

This was similar to Example 20, except that the lithium chloride was replaced by 20% (27.5 g) of sodium chloride and the concentration of the HCl increased to 2M (pH at room temperature −0.11). A yield of 91% (8.26 g) and an $M_p$ of 100,000 was obtained. The product of Example 28 was reduced to leucoemeraldine form for NMR measurements as before, and the resulting trace is given as FIG. 12.

EXAMPLES 29–30 AND COMPARISON EXAMPLE C

The procedure of Example 14 was followed, except that the oxidant was added all at once in Comparison Example C and uniformly over different periods in Examples 29–30. In all cases the total reaction time remained at 45 hours. The results are summarised in Table 7:

TABLE 7

| Example/ Comparison no. | Oxidant addition time (hours) | Yield % | $M_p$ |
|---|---|---|---|
| C | 0 | 89.5 | 110,000 |
| 29 | 7 | 92.9 | 99,000 |
| 14 | 14 | 94.8 | 130,000 |
| 30 | 36 | 88.3* | 137,000 |

*low yield due to a loss in weighing, not inherent

Figure 13:
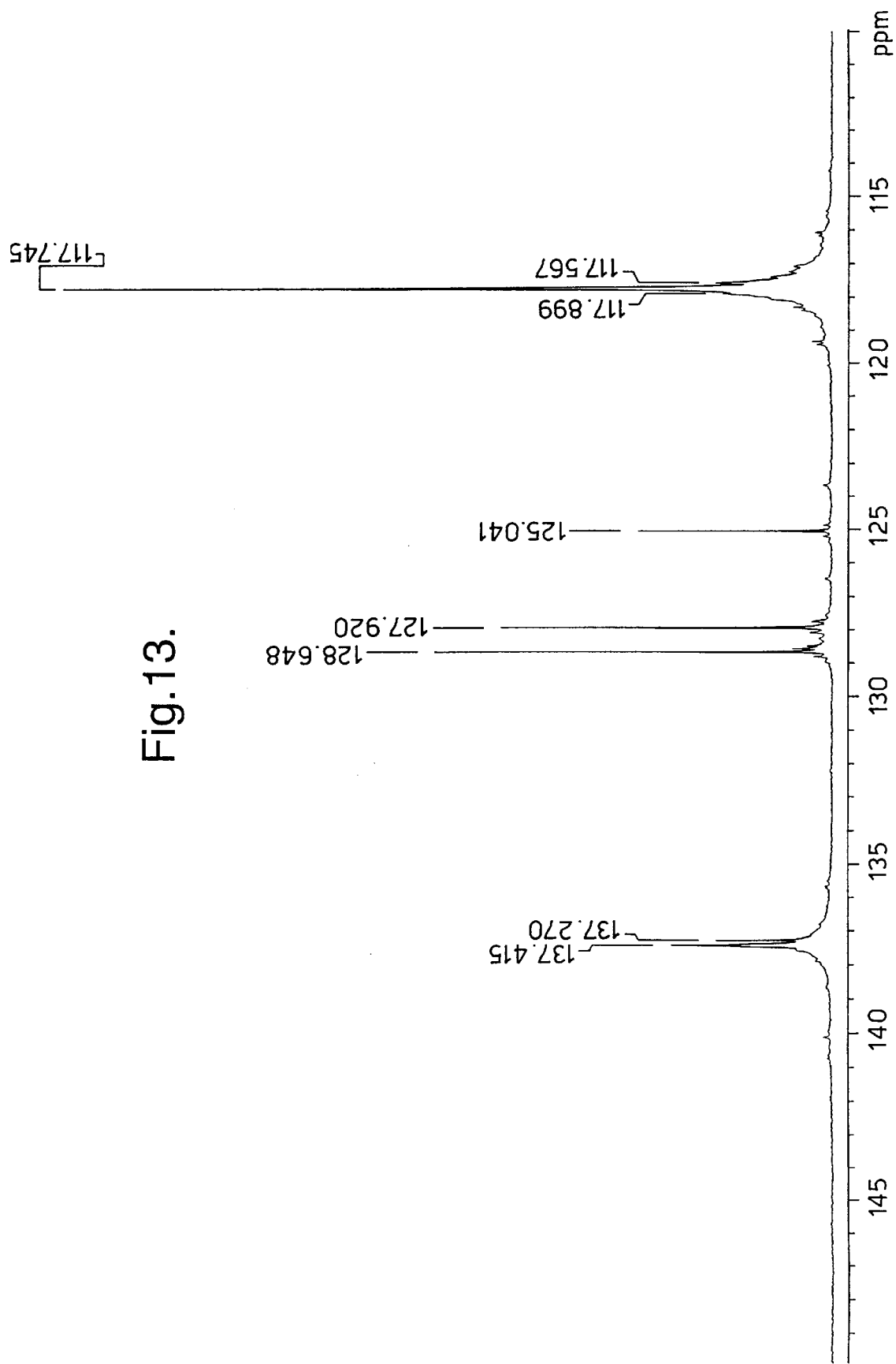

The product of Example 29 was reduced to leucoemeraldine form for NMR measurements as before, and the resulting trace is given as FIG. 13. Comparison Example C appears to indicate that slow addition of the oxidant is not essential merely to obtain high molecular weight, but note that no NMR structure measurements are available for this sample.

COMPARISON EXAMPLES D–F

The procedure of Comparison Example C was repeated except that the total reaction time was varied, with the results shown in Table 8, which well illustrates that short reaction times tend to give low yields and low molecular weights.

TABLE 8

| Comparison no. | Total Reaction time (hours) | Yield % | $M_p$ |
|---|---|---|---|
| D | 3 | 18.7 | 24,000 |
| E | 15 | 87.6 | 119,000 |
| C | 45 | 89.5 | 110,000 |
| F | 90 | 91.6 | 122,000 |

We claim:

1. An unsubstituted aniline homopolymer characterised by a nuclear magnetic resonance spectrum in its leuco form showing only two $^{13}C$ peaks, indicating the substantal absence of chain branching.

2. An unsubstituted aniline homopolymer as claimed in claim 1 having a molecular weight, as measured by gel permeation chromatography in N-methyl pyrollidone solvent containing lithium chloride using poly-2-vinyl pyridine reference polymers and recording the molecular weight corresponding to the maximum intensity of the observed peak of the gel permeation chromatography trace (the $M_p$ value), above 90,000 and up to about 170,000.

3. An unsubstituted aniline homopolymer as claimed in claim 2 in which the molecular weight is in the range 100,000 to 140,000.

4. An unsubstituted aniline homopolymer as claimed in claim 1 in oriented film form.

5. An unsubstituted aniline homopolymer in oriented film form as claimed in claim 4 having a degree of orientation corresponding to an elongation of at least 300%.

6. An unsubstituted aniline homopolymer in oriented film form as claimed in claim 4 having a degree of orientation corresponding to an elongation of about 300 to about 700%.

7. A conductive oriented film of an unsubstituted aniline homopolymer as claimed in claim 4 in its emeraldine oxidation state.

8. An unsubstituted aniline homopolymer in oriented film form having a degree of orientation corresponding to an elongation in the range 450–700% and a conductivity of at least 500 S/cm by virtue of the substantial absence of chain branching.

9. A method of making an unsubstituted aniline homopolymer characterised by a nuclear magnetic resonance spectrum in its leuco form showing only two $^{13}C$ peaks indicating the substantial absence of chain branching, comprising oxidising aniline in aqueous solution with a persulfate and characterized by the combination of conditions that the acidity of the solution throughout the reaction is such that if its temperature is adjusted to 20° C. it will have a pH in the range of from about −0.2 to +3.0;

that the temperature of the solution is in the range of from −10° to about −35° C.;

that the solution contains at least sufficient inert ionic solute to maintain it in the liquid state; and that the persulfate is added to the solution always at a rate corresponding to a total addition time of at least six hours and in a molar ratio to the aniline in the range from 1.1:1 to 1.4:1.

10. A method as claimed in claim 9 in which the temperature in the range −25° to −30° C.

* * * * *

UNITED STATES PATENT AND TRADEMARK OFFICE
CERTIFICATE OF CORRECTION

PATENT NO. : 5,837,806
DATED : November 17, 1998
INVENTOR(S) : Phillip Norman ADAMS and Andrew Paul MONKMAN It is certified that error appears in the above-indentified patent and that said Letters Patent is hereby corrected as shown below:

On the title page, under item [63], change "PCT/GB95/00358" to --PCT/GB95/00385--.

Signed and Sealed this

Ninth Day of March, 1999

Attest:

Q. TODD DICKINSON

*Attesting Officer*  *Acting Commissioner of Patents and Trademarks*